Aug. 10, 1937.  C. E. HATHORN  2,089,649

QUICK DETACHABLE CLEVIS

Filed March 26, 1935

INVENTOR.
CHARLES E. HATHORN.
BY
ATTORNEYS.

UNITED STATES PATENT OFFICE 2,089,649

QUICK DETACHABLE CLEVIS

Charles E. Hathorn, Kenmore, N. Y., assignor, by mesne assignments, to Curtiss-Wright Corporation, a corporation of New York Application March 26, 1935, Serial No. 13,057

8 Claims. (Cl. 287—100)

This invention relates to connectors and more particularly to a detachable clevis fitting for connecting the ends of cables or rods.

In aircraft construction and in the installation of accessory equipment in aircraft, operating or control cables or rods are used extensively, and it often becomes necessary to detach these cables or rods in order to remove the equipment or to provide access to inspect, service or repair such equipment or to inspect or repair the structure of the aircraft. These operations apply particularly to armament installations such as bomb racks and machine guns and the essential requirements are that the cables or other connected parts be separated and reconnected simply and quickly and that the connecting elements be operable without the necessity for any slack or play in the cables or rods so detached or connected.

It has been the custom heretofore to connect such parts with clevises or shackles with their attendant very small clevis pins and cotters. The use of small snap hooks has also been tried, but with little success due either to tensional failures, to difficulty in handling and losing the small parts, or as previously pointed out, to the requirement that there be adequate slack in the cables to permit the operation of the connecting elements. It has also been found that projecting parts have often caused previous devices to open accidentally, which of course is highly objectionable.

It is, therefore, an object of this invention to provide a connector adaptable for such purpose which is simple in construction and operation and adapted to be readily engaged and disengaged without the necessity for the use of any tools.

A further object of the invention resides in the provision of a device of this nature which can readily be used to attach or detach members which are taut and have no slack or play between them.

It is another object to provide such a connector which comprises a single unit and has no separate parts which might become misplaced or lost after the same has been disengaged.

Another object of the invention resides in the provision of such a device which is free of projecting parts which might contribute to accidental opening due to fouling or becoming caught on adjacent structures, and wherein the arrangement of the parts is compact and inherently one of high tensile strength. It is also contemplated that the particular elements which lock or cause the present device to remain in engaged position are not subjected to the tensile or other stresses which are transmitted between the elements which are being connected together.

Other objects and advantages will become apparent during the course of the following description when considered with the accompanying drawing, forming a part of this specification, and in which like numerals are employed to designate corresponding parts in all the views.

Fig. 1 indicates a plan view of my improved connecting device, a portion of which is shown broken away and in cross-section;

Fig. 2 indicates an elevation of the same wherein the same part of the device is similarly shown in cross-section;

Figure 1:
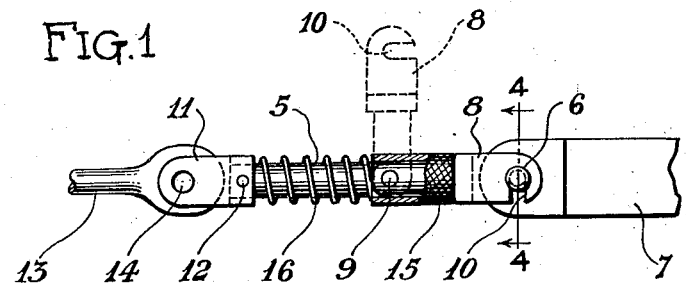
Figure 2:
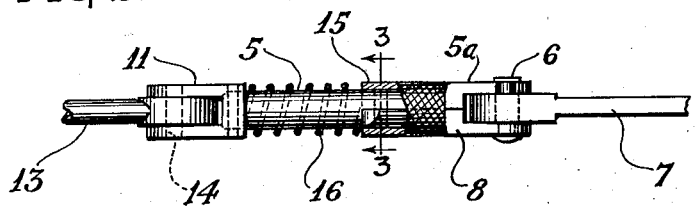
Figure 3:
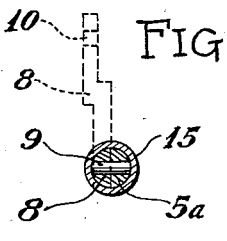
Fig. 3 is a cross-sectional view taken along the lines 3—3 of Fig. 2 and showing in dotted lines the clevis half in opened position.
Figure 4:
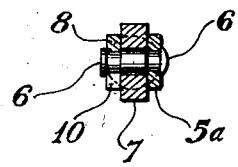
Fig. 4 is a cross-sectional view taken along the lines 4—4 of Fig. 1 at the pin of the separating clevis member.

The connector comprises essentially a cylindrical shank portion 5 attached to a fixed clevis 11 by means of the pin 12 and having formed at its other end a half clevis portion 5a. The fixed clevis portion 11 is provided with a transverse opening 14 by means of which it may be secured to a wire terminal fitting 13 or other part which is desired to be connected. Intermediate its ends the shank is provided with a transverse pin 9 which forms a pivot about which the clevis half 8 is adapted to be rotated. The clevis half 8 is symmetrically similar in shape to the clevis half 5a, which forms a part of the shank member 5, to which member 8 is pivotally attached by means of the pin 9. The clevis halves 5a and 8 are semi-circular in cross-section and meet in a common plane surface, which may be perpendicular to the axis of pin 9 and which extends diametrically across the cylindrical shank portion 5 along which the two clevis halves 5a and 8 part or separate, the inner end of the clevis half 8 being suitably rounded near the pivot pin 9 in order that it clear the adjoining shoulder portion of the shank 5 when it is rotated between its opened and closed positions.

The clevis half 5a has fixably attached thereto a cylindrical pin 6 having a recessed portion into which the slot 10 in the clevis half 8 is adapted to fit when the two clevis halves are in closed position. A member 7, being one of the members which it is desired be connected to the first member 13, may be a rod or cable end or the slide on a machine gun or other member, and is provided with an opening which may be passed over pin 6 when the parting clevis 5a—8 is in its opened position.

The fixed clevis 11 and the parting clevis 5a—8 are positioned at the ends of the cylindrical shank portion 5, the circular cross-section of which is further carried out by the two semi-circular shank halves of the fixed clevis half 5a and the pivoted clevis half 8. The clevises, being somewhat wider than the diameter of the shank portion 5, are adapted to retain between them a sleeve 15 and a compression spring 16. The sleeve 15 is a hollow cylindrical member having an opening therein which is adapted to slide freely in a longitudinal direction with respect to the shank 5, and has its outer surface knurled in order to facilitate its being moved by hand along the shank.

The compression spring 16 is positioned about the shank member 5 between the shoulder or stop formed by the fixed clevis 11 and the knurled sleeve 15, and constantly urges the latter into its extreme position where the sleeve bears against the shoulders of the parting clevis halves 5a and 8.

Figure 5:
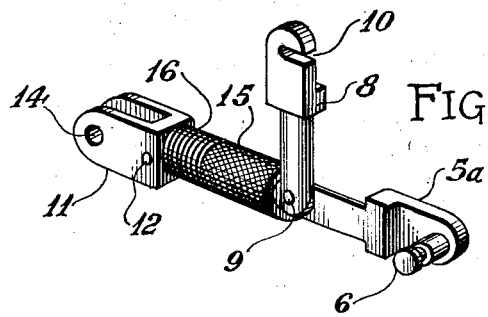
Fig. 5 is a perspective view of the device shown in opened position.

In operation, the members 7 and 13 are brought together in alinement and the fixed clevis portion 11 of the device is slipped over the cable or rod end 13 and a bolt or clevis pin is then inserted through the opening 14 and suitably fixed therein by a nut, cotter pin or other suitable means. The connector is then alined with the other member 7 to be connected and the sleeve 15 is drawn along the shank portion 5 toward the fixed clevis 11, thereby compressing the spring 16. When the sleeve 15 has been moved to the position shown in Fig. 5, the spring 16 being compressed, the end of the sleeve nearest the parting clevis end 5a—8 will have passed sufficiently beyond the pin 9 and the hinged end of pivoted clevis 8 to permit the latter to be rotated into such position which is also indicated by the dotted lines in Fig. 1. The opening in the end of member 7 is thus permitted to be passed over the pin 6 and the hinged clevis half 8 can be rotated back to its alined position where the slot 10 will again engage the recessed portion of the pin 6 thereby retaining member 7 between the two clevis halves 5a and 8. The knurled sleeve 15 is then released and moves of its own accord against the shoulder of the clevis halves 5a and 8 due to the action of the compression spring 16 which is restrained from movement in the opposite direction by the corresponding shoulder portion of the fixed clevis half 11.

The connecting device is thus maintained in its closed position and when it is desired that the connected parts again be released it is only necessary to withdraw the sleeve against the compression spring, and rotate the clevis half 8 to a position where the member 7 can be disengaged from the pin 6. This disengagement is readily and simply accomplished without the need of any tools and inasmuch as under ordinary conditions the fixed clevis 11 would be permanently attached to the cable or rod terminal 13, there are no parts to become displaced or lost. It is also to be noted that this detachment may be made without the existence of any slack in the parts connected, and without the necessity for any drawing of the parts 7 and 13 together in order to facilitate releasement.

Obviously, the rivet or pin 12 may be omitted if desired and the shank portion suitably riveted or upset through the back of the clevis 11 so that the latter could swivel about the axis of the shank portion 5. The end of shank 5 may also be threaded to engage the barrel portion of a turnbuckle, in which case a suitable shoulder or other means must be provided for anchoring the near end of the compression spring 16. Likewise, a male clevis or tongue portion may be substituted for the bifurcated clevis shown in the drawing.

Other modifications which will become apparent to one versed in the art, are intended to be included within the scope of the appended claims.

I claim as my invention:

1. In a connecting device, a shank member, a clevis half formed on said shank member, a pin fixedly attached to said clevis half, a second clevis half pivotally attached to said first mentioned clevis half and having a slot adapted to engage said pin when clevis halves are in alined position, and a sleeve adapted to maintain the said clevis halves in the said alined position.

2. In a connecting device, a shank member, a clevis half formed on said shank member, a pin fixedly attached to said clevis half, a second clevis half pivotally attached to said shank member and having a slot adapted to engage said pin when clevis halves are in alined position, and a sleeve adapted to maintain the said clevis halves in the alined position.

3. A connector comprising an attachment end, a parting clevis end, a shank member connecting the said ends, the parting clevis end comprising a clevis half fixedly attached to the said shank member and having a pin attached thereto, and a second clevis half pivotally attached to the shank member, and having a slot therein adapted to engage the said pin when in the closed position and means whereby the said clevis halves are maintained in the closed position.

4. A connector comprising an attachment end, a parting clevis end, a shank member connecting the said ends, the parting clevis end comprising a clevis half fixedly attached to the said shank member and having a pin attached thereto, and a second clevis half pivotally attached to the shank member, and having a slot therein adapted to engage the said pin, a sleeve adapted to be moved longitudinally along said shaft and to maintain the said clevis halves in their closed position and a spring positioned about the said shank between the said attachment end and the said sleeve and adapted to resiliently maintain the said sleeve in a position where it maintains the said clevis halves in their closed position.

5. A fitting comprising attachment terminals, a shank member interconnecting the said terminals, and a sleeve slidably mounted on the said shank member and having its longitudinal movement thereon limited by the said attachment terminals, one of the said terminals comprising cooperable halves, a portion of the said shank member having one of said terminal halves formed thereon, a second terminal half having a shank portion pivotally attached to said shank member and adapted to engage the first said terminal half, the said shank portions when in the engaged position of their respective terminal halves, forming a combined cross-sectional shape substantially identical to that of the shank member, such that the said sleeve having an opening adapted to fit about said shank cross-section may be slid from a position about the shank to a position about the said shank portions thereby maintaining the said terminal halves in their closed positions, and means to continually urge the said sleeve into its last said position.

6. A clevis fitting comprising a shank having a reduced end portion, a clevis half formed on said shank end portion, the said clevis half having a transverse pin provided with an annular recess, a second clevis half transversely pivoted to the said shank end portion and provided with a slot adapted to engage the recess in said pin when clevis halves are in their engaged positions, and means to prevent the disengagement of said clevis halves.

7. A clevis fitting comprising a shank having a reduced end portion, a clevis half formed on said shank end portion, the said clevis half having a transverse pin, a second clevis half transversely pivoted to the said shank end portion and provided with means adapted to engage the said pin when said clevis halves are in their engaged positions, and a sleeve member slidably mounted upon said shank and adapted to releasably retain said clevis halves in engagement.

8. A clevis fitting comprising a cylindrical shank having a reduced end portion, a clevis half formed on said shank end portion, the said clevis half having a transverse pin provided with an annular recess, a second clevis half transversely pivoted to the said shank end portion and provided with a slot adapted to engage the recess in said pin when said clevis halves are in their engaged positions, portions of the said clevis halves forming in their engaged position a cylinder continuous with, and of the same diameter as the said shank, a tubular sleeve member associated with said shank and longitudinally slidable thereon such that its position with respect to the shank determines the locking or releasement of the said clevis halves, and means concentrically disposed upon said shank whereby the said sleeve member is continually urged into its locking position.

CHARLES E. HATHORN.